US008327742B1

(12) United States Patent
Austin

(10) Patent No.: US 8,327,742 B1
(45) Date of Patent: Dec. 11, 2012

(54) DIAMOND TOOL MICRO-HEIGHT-ADJUSTER WITHIN A MULTI-TOOL ROTATING HEAD

(75) Inventor: James A. Austin, Lompoc, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 935 days.

(21) Appl. No.: 12/044,492

(22) Filed: Mar. 7, 2008

(51) Int. Cl.
B23C 5/22 (2006.01)
B23C 5/24 (2006.01)
(52) U.S. Cl. .............................. 82/1.11; 407/37; 407/39
(58) Field of Classification Search .............. 407/33–39, 407/53, 88, 89; B23C 5/24, 5/22
See application file for complete search history.

(56) References Cited

U.S. PATENT DOCUMENTS

| | | | | |
|---|---|---|---|---|
| 2,125,005 A * | 7/1938 | Jearum | ........................... | 407/74 |
| 2,204,855 A * | 6/1940 | Healy | ........................... | 408/116 |
| 2,553,761 A * | 5/1951 | Gooding | ........................ | 407/74 |
| 2,586,955 A * | 2/1952 | Kaiser | ............................. | 407/42 |
| 2,678,487 A * | 5/1954 | Onsrud | .......................... | 407/36 |
| 2,959,991 A * | 11/1960 | Nixon | .......................... | 408/146 |
| 3,195,376 A * | 7/1965 | Bader | .......................... | 408/146 |
| 3,329,065 A * | 7/1967 | Vaughn | ......................... | 409/232 |
| 3,363,299 A * | 1/1968 | Gowanlock | ..................... | 407/39 |
| 3,447,403 A * | 6/1969 | Vogel, Sr. et al. | ............. | 408/146 |
| 3,675,290 A * | 7/1972 | Mayer | ............................. | 407/37 |
| 3,701,187 A * | 10/1972 | Erkfritz | .......................... | 407/46 |
| 3,703,755 A * | 11/1972 | Guensche | ....................... | 407/87 |
| 3,708,843 A * | 1/1973 | Erkfritz | ........................... | 407/38 |
| 3,755,868 A * | 9/1973 | LaForge et al. | ................ | 407/75 |
| 3,839,772 A * | 10/1974 | Shimomura et al. | ............ | 407/36 |
| 4,014,623 A * | 3/1977 | Eckle | .............................. | 408/183 |
| 4,311,418 A * | 1/1982 | Erkfritz et al. | .................. | 407/39 |
| 4,318,647 A * | 3/1982 | Erkfritz | .......................... | 408/153 |
| 4,344,724 A * | 8/1982 | Kress et al. | ..................... | 407/36 |
| 4,395,168 A * | 7/1983 | Vicari | .............................. | 408/20 |
| 4,428,704 A * | 1/1984 | Kalokhe | ........................ | 408/156 |
| 4,486,131 A * | 12/1984 | Eckle | ............................. | 408/185 |
| 4,497,601 A * | 2/1985 | Negus | ........................... | 408/156 |
| 4,586,855 A * | 5/1986 | Rawle | .............................. | 407/55 |
| 4,623,284 A * | 11/1986 | Greiff | ............................. | 407/38 |
| 4,710,073 A * | 12/1987 | Peterson | ....................... | 408/181 |
| 4,848,977 A * | 7/1989 | Kieninger | ....................... | 407/39 |
| 4,883,392 A * | 11/1989 | Lieser | ........................... | 409/165 |
| 4,936,717 A * | 6/1990 | Bosek | .............................. | 407/31 |
| 4,936,718 A * | 6/1990 | Proffitt | ............................ | 407/36 |
| 4,964,763 A * | 10/1990 | Kieninger | ....................... | 407/40 |
| 4,971,491 A * | 11/1990 | Cook | .............................. | 409/131 |
| 5,102,269 A * | 4/1992 | Arai et al. | ....................... | 407/41 |
| 5,120,166 A * | 6/1992 | Woerner | ......................... | 407/12 |

(Continued)

FOREIGN PATENT DOCUMENTS

DE 10108103 A1 * 8/2002

(Continued)

*Primary Examiner* — Andrea Wellington
*Assistant Examiner* — Sara Addisu
(74) *Attorney, Agent, or Firm* — Withrow & Terranova, PLLC

(57) ABSTRACT

A rotating head and a corresponding method of removing material employing a base having a substantially planar underside, a plurality of bit holder assemblies connected to the base and holding a corresponding plurality of bits via the assemblies, and apparatus permitting adjusting cutting surfaces of the bits to be held at different distances from the underside, which enables removing material from a target by presenting it to the rotating base and thereby engaging the cutting surfaces with the target.

16 Claims, 4 Drawing Sheets

U.S. PATENT DOCUMENTS

| | | | | |
|---|---|---|---|---|
| 5,193,950 | A | * | 3/1993 | Hunt ............................ 408/153 |
| 5,209,610 | A | * | 5/1993 | Arai et al. ...................... 407/36 |
| 5,316,417 | A | * | 5/1994 | Romi ............................ 408/153 |
| 5,454,667 | A | * | 10/1995 | Cirino et al. .................. 408/181 |
| 5,620,286 | A | * | 4/1997 | Youden ........................ 409/157 |
| 5,704,735 | A | * | 1/1998 | Moreau ......................... 407/33 |
| 5,704,742 | A | * | 1/1998 | Reinauer ...................... 408/156 |
| 6,254,319 | B1 | * | 7/2001 | Maier et al. .................... 408/57 |
| 7,037,050 | B1 | * | 5/2006 | Maier et al. .................... 407/35 |
| 2009/0038450 | A1 | * | 2/2009 | Campbell et al. ............. 82/1.11 |

FOREIGN PATENT DOCUMENTS

JP  2006136970 A * 6/2006

\* cited by examiner

DIAMOND TOOL MICRO-HEIGHT-ADJUSTER WITHIN A MULTI-TOOL ROTATING HEAD

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to a method and apparatus for accurately setting micron level cutting edge stagger in a multi-tool rotating head.

2. Description of Related Art

At present there is no method of accurately setting cutting edge position so that the stagger is approximately 0.000080 inch (2 microns) between removal stages. Accordingly, there typically no stagger (no multiple-tool removal) method in rotating head tools employed for thinning ceramics (crystals), plastics, and certain metals so as to significantly minimize the time it takes to perform the thinning and finishing operations. Accordingly (because the crystals are subject to brittle fracture), 20 passes are typicality required to bring crystal thickness down from an original 0.030 inches to 0.001 inches. Material removal passes (because of slow feed rates) are usually approximately 20 minutes each.

In traditional machining, the present invention is perhaps most similar to a "shell mill", a type of rotating head multiple pockets with pre-machined stagger around its periphery. Inserts (cutting tools) are Olen secured into the pockets as required. However, no known shell mill provides for the accuracy and adjustability of the stagger, and the designed stiffness, of the present invention.

The present invention allows accurate staggering (radially and axially) of the 3 rotating head tools, bringing production time down by 50%. (The staggers set between the three tools, and the per pass cut depth progression does not allow for a ⅔ time reduction). 6.6 hours of production time is shortened to approximately 3.2 hours.

BRIEF SUMMARY OF THE INVENTION

The present invention is of a rotating head and a corresponding method of removing material, comprising: providing a base having a substantially planar underside; employing a plurality of bit holder assemblies connected to the base; holding a corresponding plurality of bits via the assemblies; adjustable cutting edges of the bits to be held at different distances from the underside (axial stagger); and removing material from a target by rotating the head and thereby engaging the cutting edges with the target. In the preferred embodiment, the bits are diamond bits, the cutting edges are curved, and the pluralities each number three (most preferably wherein each bit holder assembly is separated from its neighbors by 120 degrees of rotation). (The invention is not limited to 3 tools each separated by 120 degrees. The inventor has experience with 9 tools each separated by 40 degrees.) The stagger distances can be set to ±1 micron accuracy, and the cutting surfaces are preferably held at different distances (radial stagger) from the center of the head. The bit holder assemblies each comprise a tool holder with a plurality of set screws, a differential-screw engaging a center of the corresponding bit, and a threaded upper insert engaging the tool holder and the corresponding differential-screw.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a method and apparatus for accurately setting micron-level (one micron is approximately 0.000040 inch) cutting edge stagger in a multi-tool rotating head. This permits a significantly faster production rate in thinning ceramic (crystal) materials. (Non-ferrous metals and plastics can also be produced in this way). A differential-pitch (micrometer drive) is preferably incorporated into the diamond tool holder assembly. The pitch differential preferably allows for ⅛ turn of the adjuster screw to equal 1 micron of tool edge vertical travel (adjustment).

The invention allows one to successfully adjust (and lock into place) the axial positions of multiple different cutting edges to within ±1 micron accuracy. For example, in a three-tool system, one edge (edge A) may be 2.5 microns different than edge B, and edge B may be 5 microns different than edge C. In order to provide extreme smoothness (low roughness, on the order of 20 angstroms Root-Mean-Square (RMS)) on a ceramic (crystal) surface, the stiffness of the resultant adjustment must be essentially solid, that is, locked in place, with no springs or other tensioners actively employed.

Figures 1, 2:
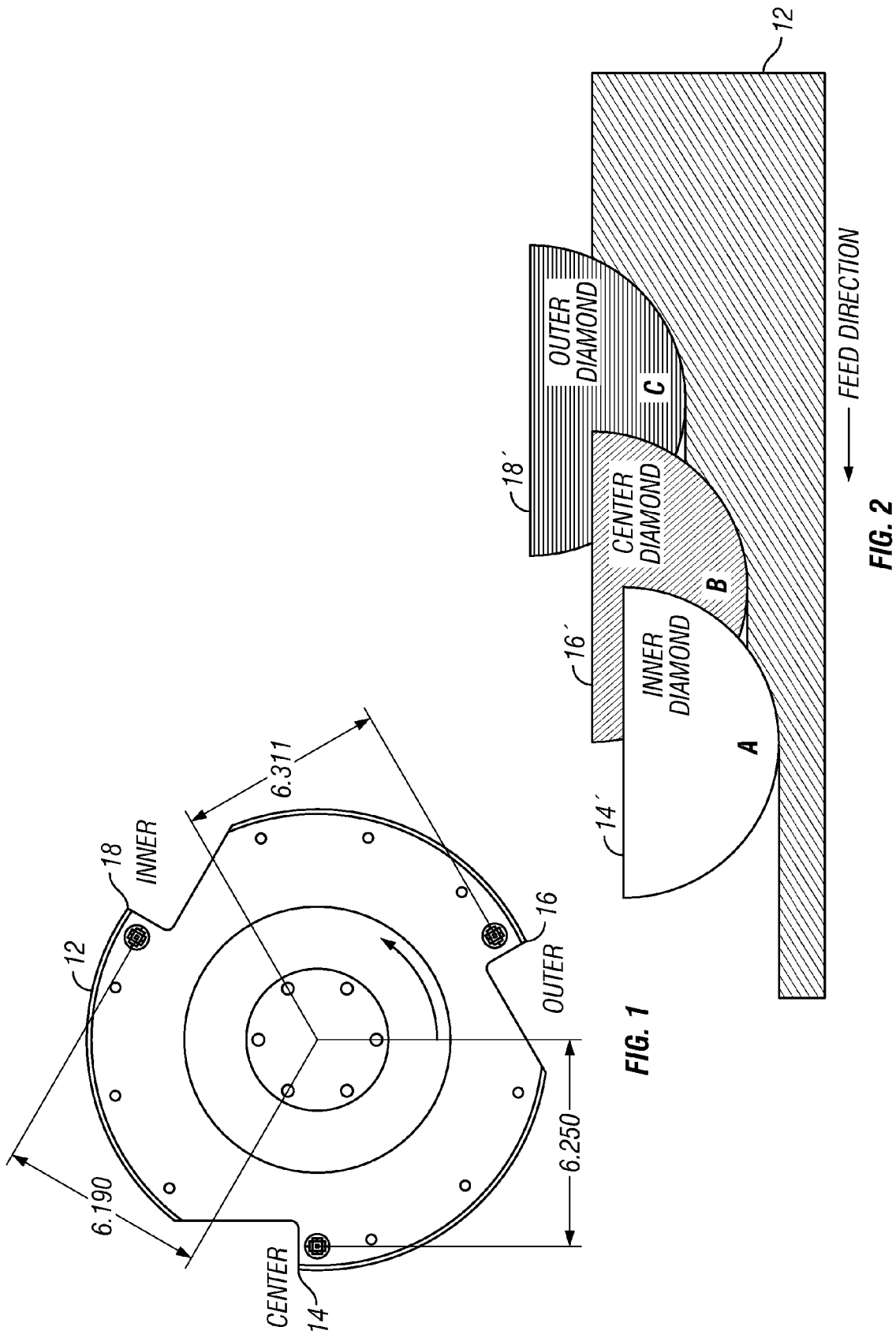
FIG. 1 is a top view of a three-tool embodiment of the invention.
FIG. 2 is a side schematic view of the dynamic three-tool embodiment showing one staggering pattern between the three tools, staggering being 0.0002 inches (5 microns) between outer and center diamonds and 0.0001 inch (2.5 microns) between inner and center diamonds, and therefore a 0.0003 inches (7.5 microns) stagger between inner and outer diamonds.

FIG. 1 is a top view of the preferred embodiment 10 of the invention, comprising the circular base (the rotating head) 12, inner tool assembly 18, center tool assembly 14, and outer tool assembly 16. Each tool assembly incorporates a cutting diamond, shown as inner diamond 14, center diamond 16, and outer diamond 18 in FIG. 2. In the example of FIG. 2, the inner diamond's cutting edge apex is approximately 0.0001 inch below the center diamond's cutting edge apex, which is approximately 0.0002 inches below the outer diamond's cutting edge apex.

The inner diamond is shown in FIG. 1 as approximately 0.060 inches inward toward the center of the base from the center diamond, which is approximately 0.060 inches inward from the outer diamond. This establishes the radial stagger by design, rather than requiring repetitive operator intervention.

Figures 3, 4:
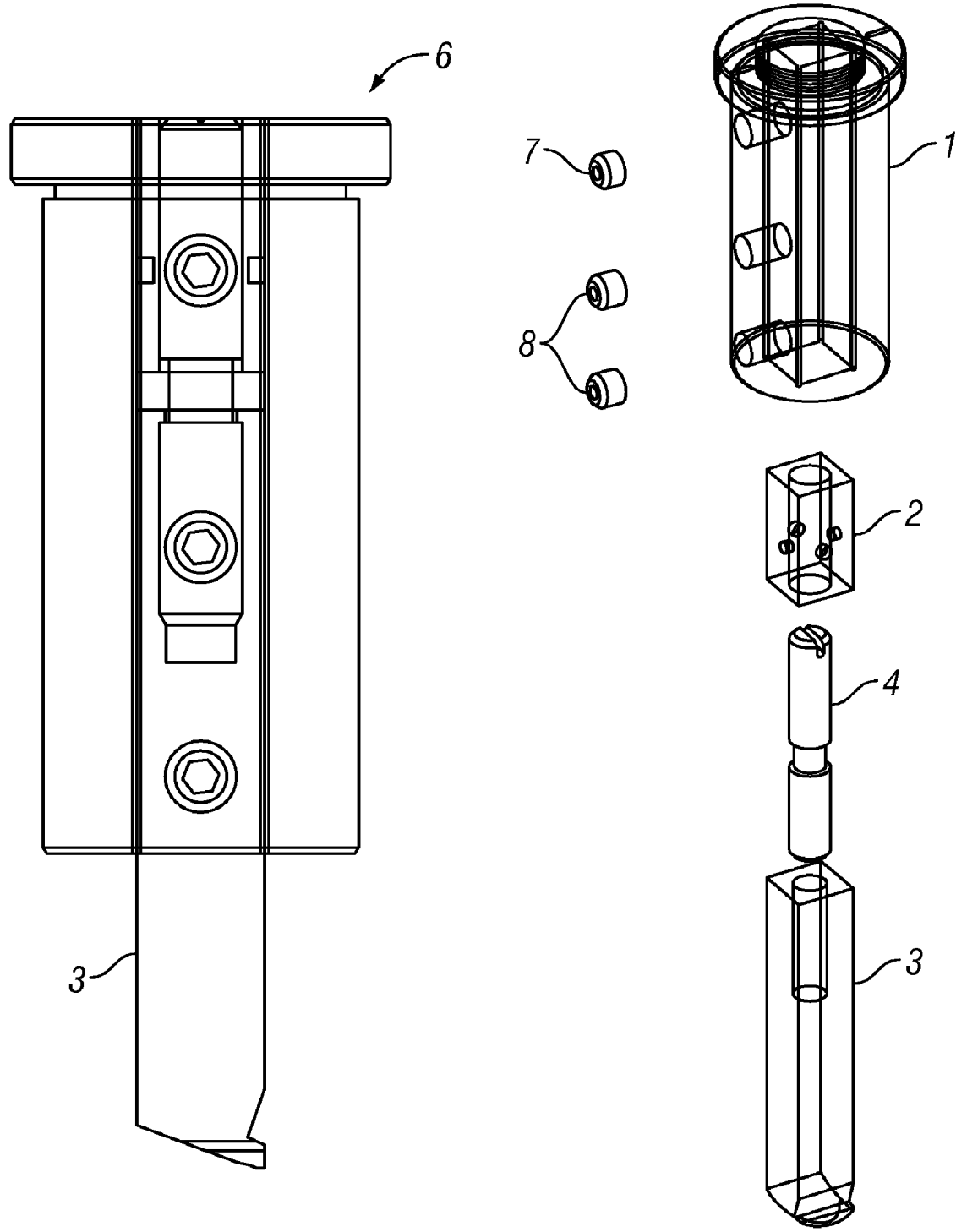
FIG. 3 is a side cutaway view of the preferred differentially adjustable diamond turning bit assembly, preferably employed as one of many tool holders in the invention.
FIG. 4 is an exploded view of the preferred micro-adjust tool holder assembly.

FIG. 3 shows the preferred diamond tool holder assembly 6 employed to provide the macro-adjustability of the 80 pitch threaded top ring, and the micro-adjustability and solid locking requirements of the present invention, as assembled. FIG. 4 shows the tool in exploded view, preferably comprising hole-centered tool holder 1 with the macro-adjust ring at the top, bit 3 (preferably modified with 8-82 RH threaded hole), differential-screw 4 (preferably slotted for screwdriver drive with 8-80 upper and 8-82 lower), threaded upper insert 2 (preferably 8-80 RH threaded), upper set screw 7 (preferably 8-32×0.125 with Allen socket and cone-point tip), and lower set screws 8 (preferably 8-32×0.125 with Allen socket and cup tip).

Figure 5:
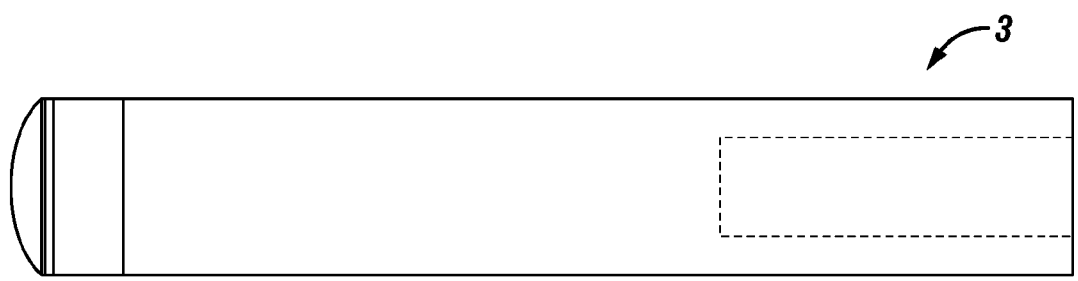
FIG. 5 is a front view of the preferred bit of the invention.
Figure 6:
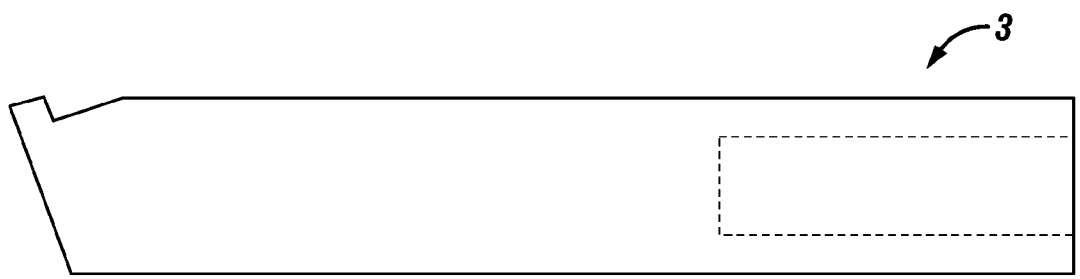
FIG. 6 is a side view of the preferred bit of the invention.

FIGS. 5 and 6 illustrate the preferred bit of the invention. The cutting tool 20 is at one end of the (preferably 1.5 inch long) shank that has a threaded hole in the opposite end. The cutting tool is preferably a solid, single-crystal diamond stone (like the stone in a ⅓ carat diamond ring) that is affixed to the end of the shank. But instead of being faceted and polished, it is ground and polished to provide a disk or puck with a smooth cylindrical front, like the outside diameter of a nickel. There is also preferably a polished flat top, intersecting the cylinder, as the top (or face) plane of a nickel intersects the outer diameter of a nickel, describing an edge. The intersection of the cylindrical front and the flat top is then a curved line, which is in this case, the "cutting edge".

Each cutting edge traces a circular path in one plane as it rotates because the rotating head is spinning at a proprietary RPM; so each of three distinct cutting planes is described by the apex of each of the three diamond's cutting edges.

Figure 7:
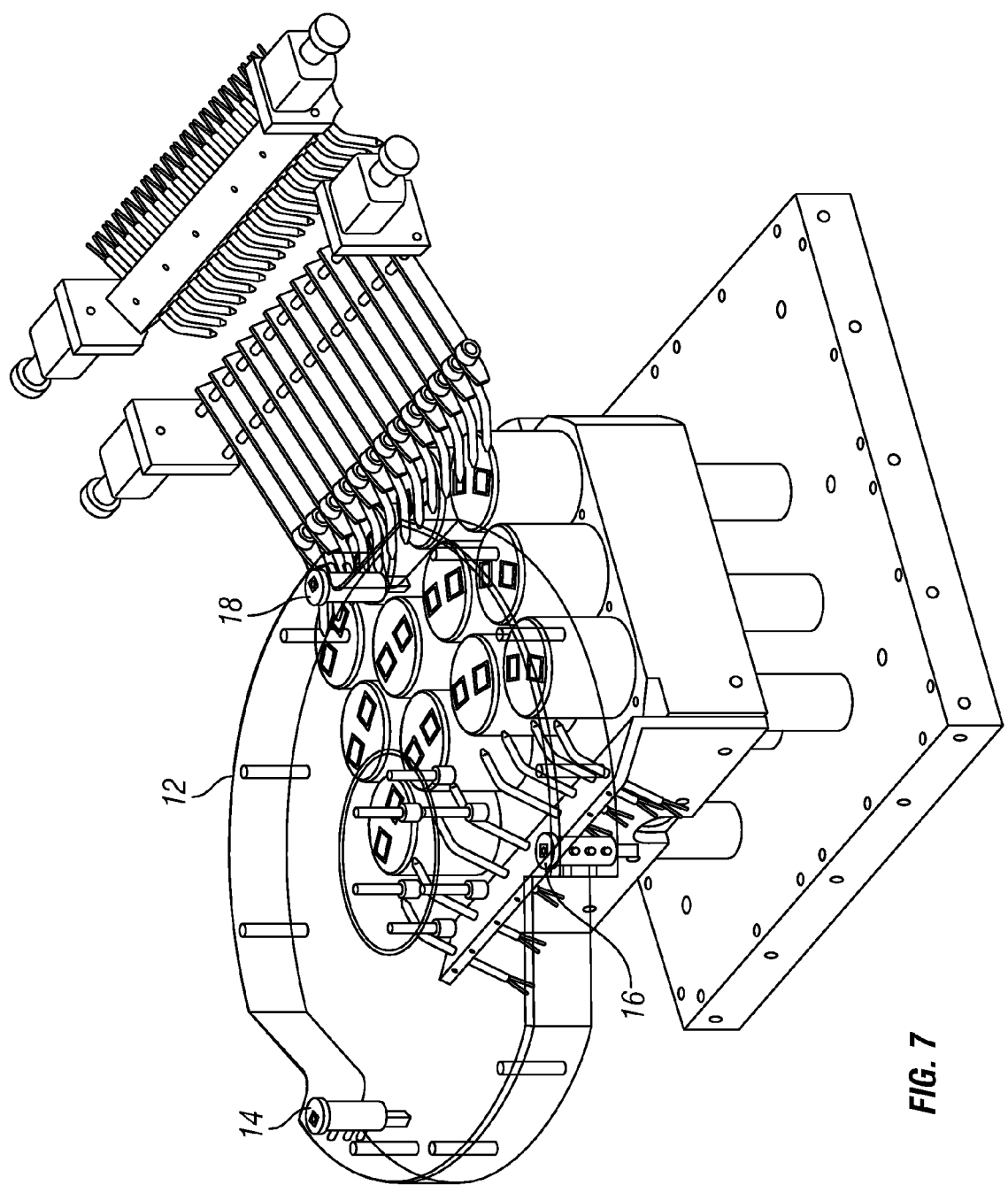
FIG. 7 is a see-through perspective view of the invention incorporated into a multi-tool rotating system.

In the tool of FIG. 1, the cutting edges extend down a different adjustable distance from the underside of the spinning rotating head. Each cutting edge is separated by 120 degrees (of rotation) in their placement in the rotating head, so that they can never actually exist as depicted in FIG. 2, but since they are spinning, it is possible to describe their cutting (removal) action as planes rather than points. The proprietary crystal target 12 is presented at a slow feed rate (travelling slowly from right to left) into the right side of the three spinning cutting planes. FIG. 7 illustrates the incorporation of the invention into a multi-tool rotating system.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A rotating head comprising:
    a base having a substantially planar underside;
    a plurality of bit holder assemblies connected to said base;
    a corresponding plurality of bits held by said bit holder assemblies, wherein said bit holder assemblies each comprise a corresponding differential-screw configured to engage a center of the corresponding bit;
    wherein cutting edges of said bits are held at different distances from said underside; and
    wherein said different distances can be set to ±1 micron accuracy via rotational/linear motion of the corresponding differential screw.

2. The rotating head of claim 1 wherein said bits are diamond bits.

3. The rotating head of claim 1 wherein said cutting edges are curved.

4. The rotating head of claim 1 wherein said pluralities each number three.

5. The rotating head of claim 4 wherein each said bit holder assembly is separated from its neighbors by 120 degrees of rotation.

6. The rotating head of claim 1 wherein said cutting edges are held for radial stagger at different distances from the center of said base.

7. The rotating head of claim 1 wherein said bit holder assemblies each comprise a tool holder with a plurality of set screws.

8. The rotating head of claim 7 wherein said bit holder assemblies each comprise a threaded upper insert engaging said tool holder and the corresponding differential-screw.

9. A method of removing material, the method comprising the steps of:
    providing a base having a substantially planar underside;
    employing a plurality of bit holder assemblies connected to the base;
    holding a corresponding plurality of bits via the bit holder assemblies, wherein said bit holder assemblies each comprise a corresponding differential-screw configured to engage the corresponding bit;
    adjusting cutting edges of the bits to be held at different distances from the underside;
    removing material from a target by presenting it to the base as it rotates, thereby engaging the cutting surfaces with the target; and
    wherein the different distances can be set for axial stagger to ±1 micron accuracy via rotational/linear motion of the corresponding differential-screw.

10. The method of claim 9 wherein the bits are diamond bits.

11. The method of claim 9 wherein the cutting edges are curved.

12. The method of claim 9 wherein the pluralities each number three.

13. The method of claim 12 wherein each bit holder assembly is separated from its neighbors by 120 degrees of rotation.

14. The method of claim 9 wherein the cutting edges are held for radial stagger at different distances radially from the center of the base.

15. The method of claim 9 wherein the bit holder assemblies each comprise a tool holder with a plurality of set screws.

16. The method of claim 15 wherein the bit holder assemblies each comprise a threaded upper insert engaging the tool holder and the corresponding differential-screw.

* * * * *